United States Patent
Tang et al.

(10) Patent No.: US 12,020,456 B2
(45) Date of Patent: Jun. 25, 2024

(54) EXTERNAL PARAMETER CALIBRATION METHOD, DEVICE AND SYSTEM FOR IMAGE ACQUISITION APPARATUS

(71) Applicant: Black Sesame Technologies Inc., San Jose, CA (US)

(72) Inventors: Zhiyong Tang, Shanghai (CN); Jiang Peng, Shanghai (CN); Tao Zhang, Shanghai (CN)

(73) Assignee: Black Sesame Technologies Inc., San Jose, CA (US)

(*) Notice: Subject to any disclaimer, the term of this patent is extended or adjusted under 35 U.S.C. 154(b) by 393 days.

(21) Appl. No.: 17/585,213

(22) Filed: Jan. 26, 2022

(65) Prior Publication Data
US 2022/0254064 A1 Aug. 11, 2022

(30) Foreign Application Priority Data
Feb. 7, 2021 (CN) .......................... 202110179411.1

(51) Int. Cl.
*G06K 9/00* (2022.01)
*A61B 5/18* (2006.01)
(Continued)

(52) U.S. Cl.
CPC .............. *G06T 7/80* (2017.01); *B60W 40/04* (2013.01); *B60W 50/06* (2013.01);
(Continued)

(58) Field of Classification Search
CPC ............. G06K 9/00; A61B 5/18; A61K 35/12
(Continued)

(56) References Cited

U.S. PATENT DOCUMENTS

2010/0104139 A1* 4/2010 Kuehnle ............... G06V 20/588
382/106
2014/0118552 A1* 5/2014 Takahama ........... B60W 40/072
348/148
(Continued)

FOREIGN PATENT DOCUMENTS

| CN | 106875448 A | 6/2017 |
|---|---|---|
| CN | 108450058 A | 8/2018 |

(Continued)

OTHER PUBLICATIONS

Yuan Liu, Research on Lane Detection and Departure Warning Methods for Assisted Driving, China Excellent Master's Dissertation Electronic Journal Network, Jul. 15, 2020.
(Continued)

*Primary Examiner* — Seyed H Azarian
(74) *Attorney, Agent, or Firm* — Timothy T. Wang; Ni, Wang & Massand, PLLC (57) ABSTRACT

An external parameter calibration method for an image acquisition apparatus is disclosed. The method includes acquiring images from images acquired by the image acquisition apparatus. The images contain reference objects acquired by the image acquisition apparatus during the driving of the vehicle. The reference objects in the images are divided into a number of sections along a road direction in which the vehicle is located, and reference objects in each of the sections are fitted into straight lines. Pitch angles and yaw angles of the image acquisition apparatus are determined based on vanishing points of a straight line in each of the sections. The sequences of the determined pitch and yaw angles are filtered. Straight portions in the road from the filtered sequences of pitch and yaw angles are obtained. Data of the pitch angles and yaw angles corresponding to the straight portions are stored to a data stack.

10 Claims, 4 Drawing Sheets

(51) Int. Cl.
*B60W 40/04* (2006.01)
*B60W 50/06* (2006.01)
*G06T 7/80* (2017.01)

(52) U.S. Cl.
CPC ... *B60W 2420/403* (2013.01); *B60W 2552/53* (2020.02); *G06T 2207/30256* (2013.01)

(58) Field of Classification Search
USPC ........ 382/100, 103–104, 106–107, 113, 122, 382/123, 154, 155, 168, 173, 181, 199, 382/219, 224, 232, 254, 260, 274, 382/284–291, 305, 312; 348/148
See application file for complete search history.

(56) References Cited

U.S. PATENT DOCUMENTS

| | | | |
|---|---|---|---|
| 2020/0217656 A1* | 7/2020 | Tang | G06V 20/588 |
| 2021/0146839 A1* | 5/2021 | Kim | B60K 35/00 |
| 2021/0227115 A1* | 7/2021 | Nakayama | B60Q 9/00 |
| 2022/0270358 A1* | 8/2022 | Cox | G06V 10/811 |

FOREIGN PATENT DOCUMENTS

| | | |
|---|---|---|
| CN | 109191531 A | 1/2019 |
| CN | 109389650 A | 2/2019 |
| CN | 109859278 | 6/2019 |
| CN | 110855906 A | 2/2020 |
| CN | 110930459 A | 3/2020 |
| CN | 111429527 | 7/2020 |
| CN | 111612849 A | 9/2020 |
| CN | 111681285 | 9/2020 |
| CN | 112017249 A | 12/2020 |
| CN | 112085798 A | 12/2020 |
| CN | 112102413 | 12/2020 |
| CN | 112183512 A | 1/2021 |
| CN | 110264525 | 8/2021 |
| EP | 3174007 A1 | 5/2017 |
| WO | 2014021421 A1 | 2/2014 |

OTHER PUBLICATIONS

Guoyan Zheng, A Novel Parameter Decomposition based Optimization Approach for Automatic Pose Locking Holes from Single Calibrated Fluoroscopic Image, Pattern Recognition Letters, Dec. 30, 2009.

* cited by examiner

Fig. 5

EXTERNAL PARAMETER CALIBRATION METHOD, DEVICE AND SYSTEM FOR IMAGE ACQUISITION APPARATUS

CROSS-REFERENCE TO RELATED APPLICATIONS

The application claims priority to Chinese Patent Application No. 2021101794111 with a filing date of Feb. 7, 2021. The content of the aforementioned applications, including any intervening amendments thereto, are incorporated herein by reference.

FIELD OF THE INVENTION

The disclosure relates to a parameter calibration technology of an image acquisition apparatus, and more specifically, to an external parameter calibration technology.

BACKGROUND OF THE INVENTION

In application of compute vision, in order to determine the relationship between the three-dimensional geometric position of a certain point on the surface of a space object and its corresponding point in the image, it is necessary to build a geometric model of camera image. The parameters of these geometric models are the camera parameters.

The process of determining the camera parameters may also be referred to as camera calibration or video camera calibration. The camera parameters include internal and external parameters. Internal parameters are determined by the characteristic of the camera itself, for example, the internal parameter may include the focal length of the camera, the distortion coefficient, etc. Whereas the external parameters represent the relative position relationship between the camera coordinate system and the world coordinate system, which specifically, relates to the position of the camera, the direction of rotation, and the like, for example, the external parameters may include rotation parameters, translation parameters, and the like between the camera coordinate system and the world coordinate system. Camera calibration, specifically, is the calibration of internal and external parameters of the camera.

For the calibration of vehicle camera, the external parameters calibration method includes the calibration based on specific calibration equipment, such as calibration board, the calibration based on the track of vehicle, pedestrian, and the ground marking such as lane line. The calibration method based on the calibration board has high precision, but it requires high calibration environment and is difficult to adapt to the scene of dynamic change of camera parameters such as the driving of the vehicle. The calibration method based on vehicle, pedestrian can adapt to the scene of dynamic change of camera external parameters, but the realization is complex, the reliability is low, and the real-time performance is affected by tracking the target. The calibration method based on ground markers requires a number of feature points on the lane lines and restricts the spatial positions of the required feature points by geometric constraints such as lane line parallelism. The camera external parameters are obtained by using the perspective equation. Although this method can dynamically calibrate the external parameters of the camera during the driving of the vehicle, there are many requirements for the running environment, such as the smooth, straight and clear of the lane line.

Based on this, it is necessary to propose an improved external parameter calibration scheme, which can adapt to the scene with dynamic changes of camera parameters and has relatively low requirements for the calibration environment.

SUMMARY OF THE INVENTION

In view of this, an improved external parameters calibration method is disclosed. The external parameter calibration method for an image acquisition apparatus according to an example of the present disclosure includes acquiring images from images acquired by the image acquisition apparatus, and the images include reference objects acquired by the image acquisition apparatus during the driving of the vehicle; dividing the reference objects in the images into a number of sections along a road direction in which the vehicle is located, fitting the reference objects in each of the sections into a straight line, determining pitch angles and yaw angles of the image acquisition apparatus based on vanishing points of straight lines in each of the sections, filtering sequences of the determined pitch and yaw angles, obtaining straight portions in the road from the filtered sequences of the pitch and yaw angles, and storing data of the pitch and yaw angles corresponding to the straight portions to a data stack. The data stack further stores vehicle state data obtained from vehicle-related components for determining a vehicle running environment. When the vehicle state data indicates that the vehicle state satisfies a preset requirement, quasi-static calibration external parameters are determined from the pitch and yaw angles in the data stack.

According to some examples of the present disclosure, in the external parameter calibration method, the reference objects are reference objects that are substantially parallel to the road direction and located at least within a certain distance traveled by the vehicle. In some specific example, that reference objects are lane lines.

According to some examples of the present disclosure, in the external parameter calibration method, the vehicle state data indicates that the vehicle state satisfies a preset requirement means that the vehicle is in a smooth running state.

According to another aspect of the present disclosure, the present disclosure also provides an external parameter calibration device for an image acquisition apparatus. The device includes a processor and a memory. The memory stores instructions and the processor is configured to implement the method as described herein when executing the stored instructions.

According to a further aspect of the present disclosure, an external parameter calibration system for an image acquisition apparatus is disclosed. The system includes an acquisition unit, a first processing unit, a data stack, and a second processing unit. The acquisition unit is configured to acquire images from images acquired by the image capturing apparatus, the images being images containing reference objects acquired by the image acquisition apparatus during the driving of the vehicle. The first processing unit is configured to divide the reference objects in the images into a number of sections along a road direction and fit the reference objects within each of the sections into straight lines, based on a vanishing points of a straight line within each of the sections, determine pitch angles and yaw angles of the image acquisition apparatus, along the road direction, filter sequences of the determined pitch and yaw angles, obtain straight portions in the road from the filtered sequences of pitch and yaw angles, and store data of the pitch and yaw angles corresponding to the straight portions to a data stack. The data stack is used to store data of the pitch and yaw angles of the straight portion, and to store vehicle state data obtained from relevant components of the vehicle for determining the driving environment of the vehicle. The second processing unit is configured to determine quasi-static calibration external parameters from the pitch and yaw angles in the data stack when the vehicle state data indicates that the vehicle state satisfies a predetermined requirement.

The present application also provides an image acquisition device configured to output acquired images in response to an external parameter calibration request. The images include reference objects acquired by the image acquisition apparatus during the driving of the vehicle, and the calibrated external parameters are obtained in real time according to the correction requirement.

DETAILED DESCRIPTION OF THE EMBODIMENTS

Hereinafter, specific embodiments of the present disclosure will be described in detail with reference to the accompanying drawings. It is to be understood that the present disclosure can be embodied in many other ways than those described herein, and those skilled in the art can make modifications without departing from the spirit of the present disclosure. The disclosure is therefore not limited by the specific embodiments disclosed below.

An external parameter calibration method for an image acquisition apparatus is disclosed. The image acquisition apparatus herein refers to various equipment, devices, apparatus, systems, and the like for acquiring images, such as cameras, webcams, image sensors, and the like. The camera should be understood in a broad sense, which can be a camera in the traditional sense, or a data processing device with a camera module such as a mobile phone or a tablet.

Figure 1:
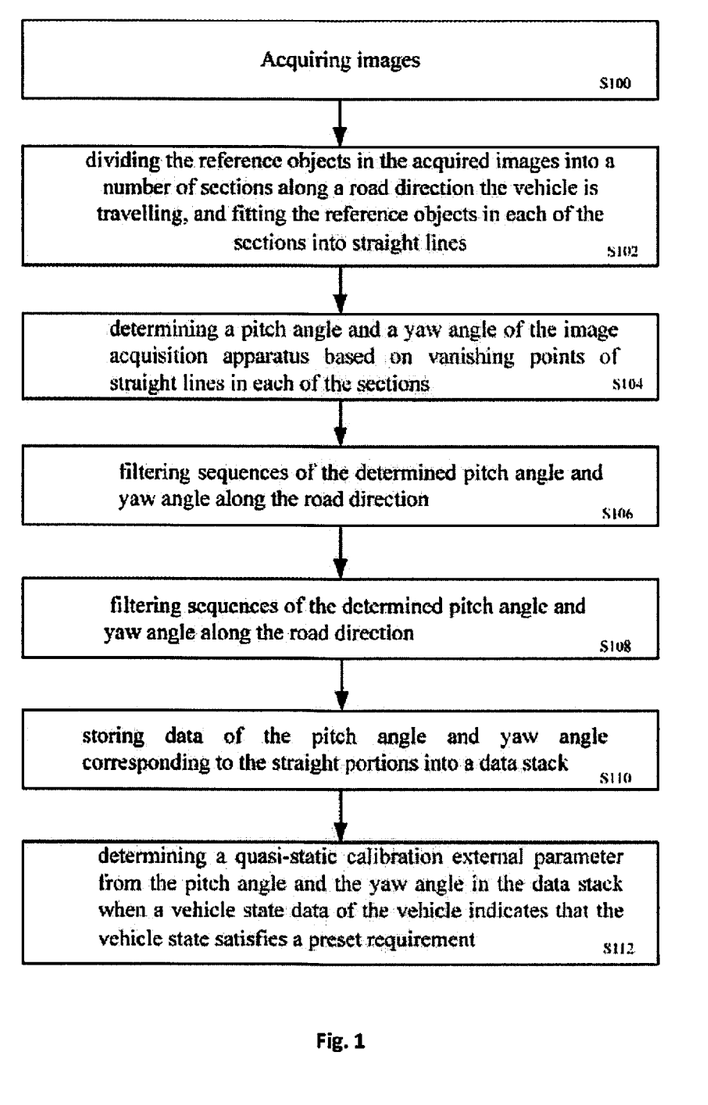
FIG. 1 is a flowchart of a method for external parameter calibration of an image acquisition apparatus according to an example of the present disclosure.

FIG. 1 is a flowchart of a method for external parameter calibration of an image acquisition apparatus according to an example of the disclosure. As shown in step S100, an image is acquired from an image captured by the image acquisition apparatus. The acquired image is an image containing reference objects acquired by the image acquisition apparatus during the driving of the vehicle. In step S102, the reference objects in the image acquired in step S100 are divided into multiple sections along the road direction of the vehicle, and the reference objects in each section is fitted into a straight line. In step S104, the pitch angle and the yaw angle of the image acquisition apparatus are determined based on the vanishing points of the straight lines in each divided section. In step S106, the determined pitch and yaw angle sequences are filtered along the road direction, i.e., the outliers are removed and the sequence is smoothed. In step S108, a straight portion in the road is acquired from the filtered sequence of the pitch and yaw angles. In step S110, pitch angle and yaw angle data corresponding to the straight portion are stored to the data stack. In step S112, quasi-static calibration external parameters are determined from the pitch and yaw angles in the data stack when the vehicle state data of the vehicle indicates that the vehicle state satisfies preset requirements. According to an example of the present application, vehicle state data obtained from vehicle-related components for determining the vehicle driving environment may be stored in a data stack.

Briefly, the external parameter calibration method for the image acquisition apparatus according to the example of FIG. 1 includes two parts, one part is the real-time calibration from step S100 to step S108, and the other part is the quasi-static calibration of steps S110 and S112. In the real-time calibration part, steps of detecting reference objects (for example, a lane line) from an image acquired by a vehicle camera of a running vehicle, dividing the reference objects into a number of sections, fitting the reference objects in a number of sections into a straight line and then calculating the pitch angle and yaw angle in the straight line, are processed for obtaining real-time calibration external parameters. In this way, the external parameters calibrated based on the images captured in the dynamic driving process can respond to the change of the vehicle attitude more quickly. In the real-time calibration process, by adopting each image containing reference objects acquired, a set of pitch angles and yaw angles can be generated in step S108, thus multiple sets of pitch angles and yaw angles are generated by repeating the steps, multiple sets of pitch and yaw angles are turned out to be stored in the data stack. When the running state of the vehicle indicates that the vehicle is in a smooth running state, the multiple sets of pitch angles and yaw angles of the data stack are taken as a basis under the condition that the multiple sets of pitch angles and yaw angles are in good consistency. The external parameters of quasi-static calibration are determined, for example, the mean value of the set of data is calculated and taken as the external parameters of quasi-static calibration.

In that example herein, If that vehicle state data indicate that the vehicle is in a smooth running state, The state in which the vehicle is close to the stationary state of the vehicle, which is judged by one or more factors of the position of the vehicle relative to the reference and the stable state of the road surface. For example, when a vehicle is moving on a straight road at a uniform speed parallel to a reference such as a lane line, the vehicle is considered to be in a state close to the stationary state of the vehicle. In this state, in chronological order, in the case of good consistency, the variance of the pitch angle and the yaw angle is respectively determined according to the time period T among the groups of pitch angle and yaw angle stored in the data stack to judge the consistency of the group of data, The mean values of the pitch and yaw angles are obtained respectively, and the obtained mean values are used as the external parameters of the quasi-static calibration. It should be understood that a smaller variance indicates a smaller change in pitch and yaw angles over time T, indicating that they correspond to the road conditions closest to the desired road condition. The vehicle state data may include vehicle speed, acceleration, vehicle steering wheel, yaw rate sensors, and the like, such as may be obtained by speed sensors, acceleration sensors, and the like of the vehicle.

According to some examples of the present disclosure, after obtaining a straight portion in the road from the filtered sequence of the pitch and yaw angles in step S108, steps S102 to S108 are performed for the straight portion until an output of the flat portion step S108 is as expected. It should be understood that when steps S102 to S108 are performed on the straight portion, the straight portion is the reference objects in the steps.

According to an example of the present disclosure, the reference objects may be reference objects that are substantially parallel to the road traveled by the vehicle during the driving of the vehicle or at least for a period of travelling of the vehicle. For example, 15 minutes, 30 minutes, etc., as long as the period of time is sufficient for acquiring the required images for processing. Reference objects are lane lines, green belts in the middle or both sides of the road, buildings beside the road, etc. In the examples described herein and in connection with the drawings, lane lines are referred to as references by way of example and not for limitation.

The method described in connection with FIG. 1 may be performed by a data processing device. The data processing device may be a separate device such as a device having a processor like a mobile phone, a tablet, a computer, etc. The data processing device is communicatively connected to a camera provided on the vehicle for obtaining an image from the camera, and also to relevant components of the vehicle to obtain state data of the vehicle from these components. Alternatively, the method described in connection with FIG. 1 may be implemented directly in a vehicle, for example in an electronic control unit, or in an infotainment system, or a digital cockpit system in a vehicle. In some cases, the method described in connection with FIG. 1 may also be performed by an external parameter calibration system for an image acquisition device described below.

Figure 2:
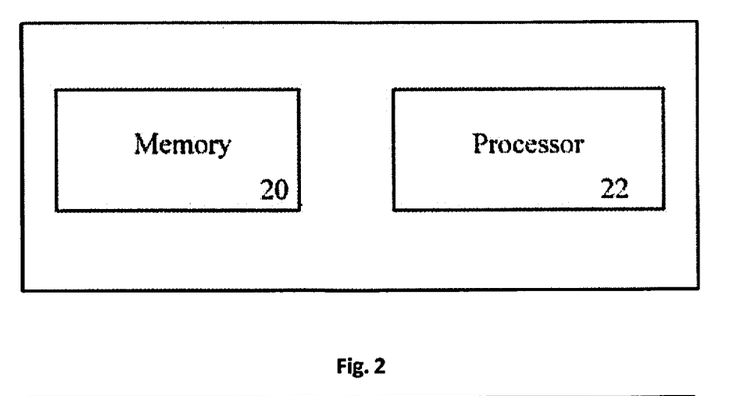
FIG. 2 is a block diagram of an external parameter calibration device according to an example of the present disclosure.

FIG. 2 is a block diagram of an external parameter calibration apparatus according to an example of the present disclosure. The external parameter calibration device is used to calibrate external parameters of the image acquisition device. Referring to the drawing, the external parameter calibration apparatus includes a processor 22 and a memory 20. The memory 20 is configured to store instructions. The processor 22 is configured to, upon execution of the stored instructions, implement the external parameter calibration method for the image capture device as described in any of the examples herein. As an example, the external parameter calibration device shown in FIG. 2 may be implemented in a vehicle, such as an electronic control unit of the vehicle, or an infotainment system of the vehicle, or a digital cockpit system. Alternatively, the external parameter calibration device shown in FIG. 2 may be implemented as a separate controller, located in a vehicle or other electronic equipment. It should be understood that when the external parameter calibration device shown in FIG. 2 is employed, it should be connected directly or indirectly to the image acquisition apparatus of the vehicle to acquire the image, as well as the relevant components of the vehicle to obtain the vehicle state data. The memory 20 may be a volatile memory unit or a non-volatile memory unit, or other device that may store data.

Figure 3:
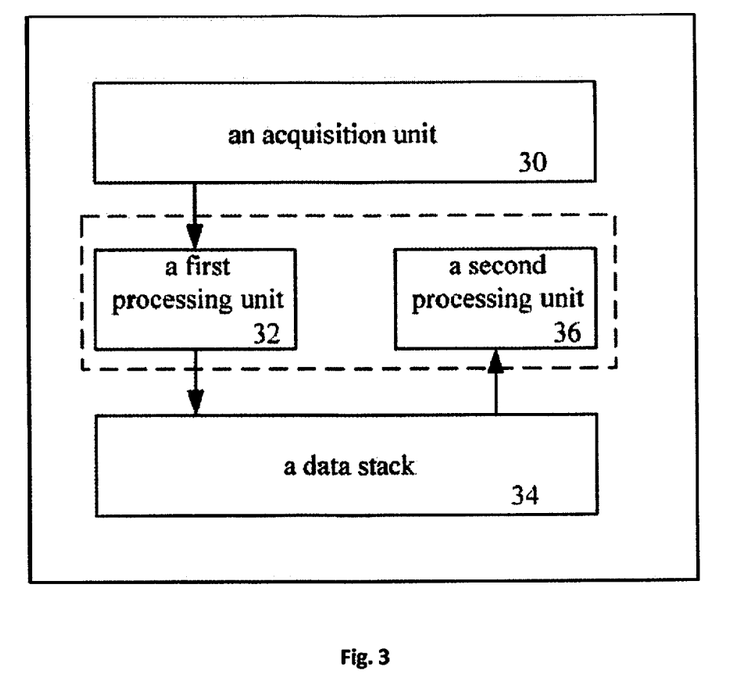
FIG. 3 is a block diagram of an external parameter calibration system for an image acquisition apparatus according to an example of the present disclosure.

FIG. 3 is a block diagram of an external parameter calibration system for an image acquisition apparatus according to an example of the present application. Referring to the drawing, the external parameter calibration system includes an acquisition unit 30, a first processing unit 32, a data stack 34, and a second processing unit 36. The external parameter calibration system is communicatively coupled to the image acquisition device for obtaining images therefrom. The acquisition unit 30 is configured to acquire images from images captured by the image acquisition apparatus. The acquired images being images containing reference objects captured by the image acquisition device during the driving of the vehicle. The first processing unit 32 is configured to divide the reference objects in the images acquired by the acquisition unit 30 into a number of sections along the road direction in which the vehicle travels, fit the reference objects in each sections into a straight line, determine the pitch angles and yaw angles of the image acquisition apparatus based on the vanishing points of the straight line in each sections, filter the determined sequence of pitch and yaw angles along a road direction, obtain a straight portion in the road from the filtered sequence of pitch and yaw angles, and store the pitch and yaw angle data corresponding to the straight portion to the data stack 34. The second processing unit 36 is configured to determine quasi-static calibration external parameters from the pitch and yaw angles in the data stack when the vehicle state data of the vehicle indicates that the vehicle state satisfies predetermined requirements. According to some examples of the present application, the data stack 34 also stores vehicle state data obtained from vehicle-related components for determining the vehicle driving environment. However, in some example, it may also be obtained by that second processing unit 36 directly from vehicle-related components.

The first processing unit 32 performs real-time calibration, and the second processing unit 36 performs quasi-static calibration. In the real-time calibration part, an image acquired by, for example, a vehicle camera is processed by the first processing unit 32 to obtain calibration external parameters including pitch and yaw angles. In the real-time calibration process, a set of pitch and yaw angles can be generated every time an image containing reference objects is adopted. As such, the first processing unit 32 produce multiple sets of pitch and yaw angles by processing the images continuously transmitted by the acquisition unit 30. The multiple sets of pitch and yaw angles are stored in a data stack 34. The second processing unit 36 obtains a set of pitch and yaw angles from the sets of pitch and yaw angle stored in the data stack 34 when the running state of the vehicle indicates that the vehicle is in a smooth running state, and obtains quasi-static calibration external parameters based on the obtained set of data. The second processing unit 36 calculates the variance of the pitch and the yaw angles respectively according to the time period T among the groups of pitch angle and yaw angle stored in the data stack to determine the consistency of the sets of data, and in the case of good consistency, the pitch and the yaw angles are averaged separately so that the obtained average is used as a calibrated external parameter.

According to some examples of the present disclosure, the first processing unit 32 is further configured to, after obtaining straight portions in the road from the filtered sequence of pitch and yaw angles, divide the straight portions into a number of sections, fit the divided straight portions in each section to a straight line, determine the pitch and yaw angles of the image acquisition device based on the vanishing points of the straight line in each section, filtering the determined sequence of pitch and yaw angles in the road direction; and obtain a straight portion of the road from the filtered sequence of pitch and yaw angles until an output of the obtained straight portion is reached as expected.

In some examples, the first processing unit 32 and the second processing unit 36 may be implemented in the same module, which is illustrated in dashed lines. For example, the first processing unit 32 and the second processing unit 36 may be implemented in a same processor.

Figure 4:
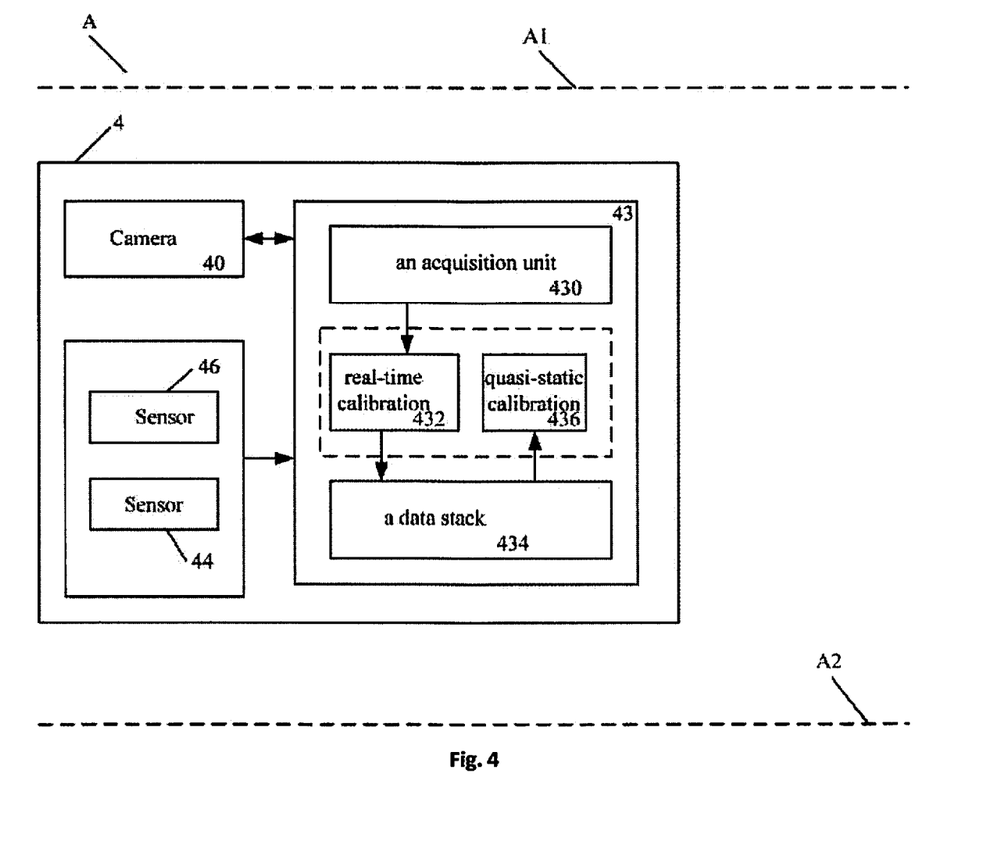
FIG. 4 is a schematic diagram of an application scenario of an external parameter calibration method for an image acquisition apparatus according to an example of the present disclosure.

FIG. 4 is a schematic diagram of an application scenario of an external parameter calibration method for an image acquisition apparatus according to an example of the present disclosure. As shown in FIG. 4, the vehicle 4 is located in a road A, and according to the present example, the vehicle 4 travels on the route defined by lane lines A1 and A2. The lane lines A1 and A2 will be referred to as reference objects in the disclosure, but as mentioned above, the reference objects may also be selected, for example, buildings on both sides of the road A or a green belt on the road A parallel to the travelling direction of the vehicle. The vehicle 4 is provided with an image acquisition apparatus, i.e., a camera 40. In the example of FIG. 4, an external parameter calibration system 43 is provided, which may be an independent system or may be implemented in an existing controller, processor or system of the vehicle. In this example, the external parameter calibration system 43 may employ the external parameter calibration system described in connection with FIG. 3. Alternatively, the external parameter calibration system in FIG. 4 may also employ the external parameter calibration apparatus described in connection with FIG. 2. The external parameter calibration system 43 is communicated with the camera 40 and also the relevant components and/or systems in the vehicle 4. In this example, the relevant components and/or systems include a vehicle speed sensor 44, a yaw rate sensor 46, and a steering wheel angle sensor (not shown). According to the present example, the external parameters calibrated by the external parameter calibration system 43 may be transmitted to the camera 40 as required so that the camera 40 may be used for calibrating the external parameters. Although the vehicle speed information, the yaw rate and the steering wheel angle information are respectively obtained from the speed sensor 44, the yaw rate sensor 46 and the steering wheel angle sensor of the vehicle, however, other components, controllers, systems, or the like providing such information may be substituted for the speed sensor 44, yaw rate sensor 46, and steering wheel angle sensor of the vehicle.

Figure 5:
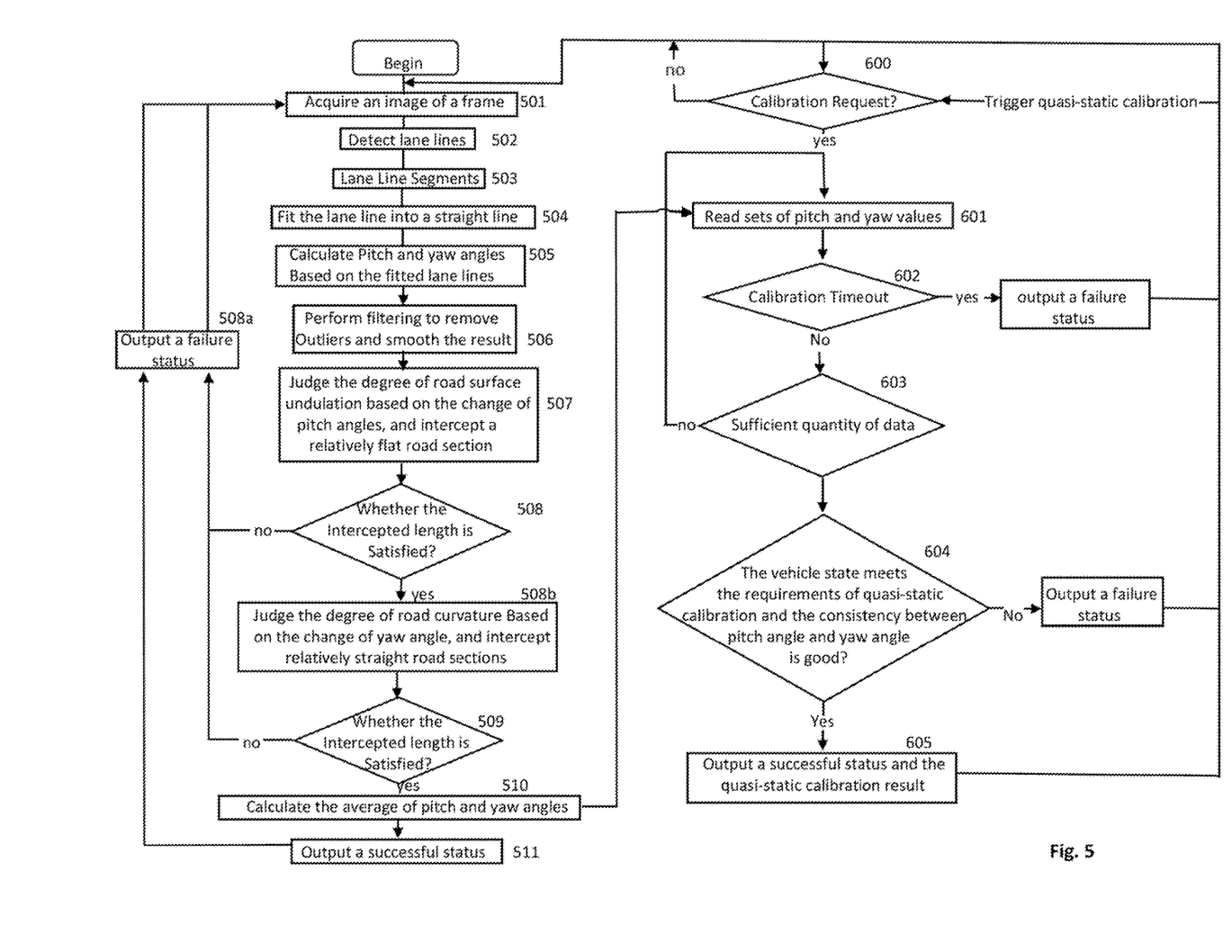
FIG. 5 is a flow diagram of a method of an external parameter calibration for an image acquisition apparatus according to a specific example of the present disclosure.

FIG. 5 is a flow diagram of a method of external parameter calibration for an image acquisition apparatus according to one specific example of the present disclosure. The present disclosure will now be described with reference to the example of FIG. 4 in which the method shown in FIG. 5 is performed.

The execution of the method may begin after the vehicle 4 is started. In step 501, the acquisition unit 43 acquires one frame of an image from the camera 40. In step 502, the real-time calibration unit 432 acquires the acquired frame image from the acquiring unit 43, and detects lane lines in the frame image. The real-time calibration unit 432 may detect lane lines based on a deep learning model. There are a number of known solutions for detecting a lane based on a deep learning model in the art, for example, as disclosed in the article "End-to-end Lane Shape Prediction with Transformers". In step 503, the real-time calibration unit 432 divides the lane line into a number of sections along the road direction. The lane line is divided into sections, or segments, along a road direction. The specific number of segments depends on the lane line detected in the actual application. For example, if the lane line detected in step 501 is relatively straight, the number of segments divided is less, otherwise, the number will be more. In step 504, the real-time calibration unit 432 fits the lane line in each section into a straight line. In step S505, the real-time calibration unit 432 calculates the pitch angle θ and the yaw angle β of the camera 40 based on the fitted lane line. Specifically, the real-time calibration unit 432 calculates the vanishing point Vp (u, v) of the straight line in each sections, that is, the intersection point of each straight line, and the pitch angle θ is as shown in expression (1) and the yaw angle is as shown in expression (2).

$$\tan\theta = \frac{v - c_y}{f_y} \quad (1)$$

$$\tan\beta = \frac{(u - c_x)\cos\theta}{f_x} \quad (2)$$

The calculation of pitch angle θ and yaw angle β takes the vehicle itself as the origin of the coordinate system, in which Cx, Cy, fx and fy are camera internal parameters.

In step S506, the real-time calibration unit 432 filters the calculated pitch angle θ and yaw angle β to remove abnormalities to obtain a smoothing result. In step S507, the real-time calibration unit 432 judges the degree of road undulation based on the change in the pitch angle θ and cuts out the road section as being relatively flat when the change in the pitch angle θ is less than the pitch angle change threshold. If, for example, that pitch angle of the camera relative to the plane of the vehicle is θ=−90 degree, and the change threshold of the pitch angle is 3 degrees, the pitch angle of the distant road surface in the range of −92 degree to −87 degrees would be considered acceptable. The most likely scenario is that the camera is provided on the vehicle. For all the photos taken, the vehicle or the road surface to be passed (depending on the position where the camera is set on the vehicle, the photo taken may or may not contain a part of the vehicle) is presented at the bottom of the photo, and the flat section taken shall be at the bottom of the photo upwardly.

In step S508, the real-time calibration unit 432 determines whether the length of the intercepted road segment satisfies the demand. If so, the process proceeds to step S508*b*, otherwise, the process proceeds to step S508*a*. If the intercepted road segment is too short, it may not meet the calibration conditions, while the intercepted road segment is too long, and it may introduce conditions that are difficult to meet the straight road surface, etc. therefore, the length of the section may be determined according to the actual demand.

In step S508*b*, the real-time calibration unit 432 judges the curved degree of the road based on the change of the yaw angle β, and considers the road surface to be a straight line when the change of the yaw angle β is less than the change threshold of the yaw angle and do further interception based on the straight and straight sections intercepted.

It is to be noted that it is not necessary to firstly judge the road surface based on the pitch angle θ and then the road surface based on the yaw angle β. The judgment based on these two parameters can be made at the same time, or the judgment based on the yaw angle β is made first and then the judgment based on the pitch angle θ is made. However, regardless of the judgment mode, the pitch angle and the yaw angle threshold value of the straight road surface that can be entered in step 510 need to respectively meet the judgment conditions.

In step S509, the real-time calibration unit 432 determines whether the length of the road segment intercepted in step S508b satisfies the demand. If step S509 is satisfied, the process proceeds to step S510, otherwise, the process proceeds to step S508a. In step S510, the straight road sections intercepted in step S508b which satisfies the step S509 are sampled, and the process returns back to step S501 to execute the above steps again. It is intended that the acquired straight road is subjected to the processing of steps S501 to S509 as the lane line again until the straight road segment intercepted input to step S510 has satisfied the desired straight level.

According to the present disclosure, in step S510, the real-time calibration unit 432 also transmits the obtained pitch angle θ and the yaw angle β to the data stack 434. It is to be noted that the acquisition unit 43 continuously acquires the captured images thereof from the camera 40 during the driving of the vehicle 4. Therefore, in step S510, the real-time calibration unit 432 outputs set of pitch angle θ and the yaw angle β corresponding to different times, and the data are stored in the data stack 434. Thus, through steps S501 to S510, the camera external parameter can be dynamically calibrated during driving, which helps to provide the calibration result frame by frame so as to respond to the change of vehicle posture more quickly. In addition, due to the consideration of dividing the lane line, it is possible to adapt to the curve and ramp situation and greatly expand the application scope of the dynamic calibration together with the common dynamic calibration scheme based on the lane line.

The quasi-static calibration unit or the quasi-static calibration function may be triggered, for example, after manual triggering, or may be triggered according to preset conditions. Manual triggering can be implemented through manual operation of an interactive button corresponding to the function (for example, the interactive button may be provided on the central control display screen in the vehicle) or manual transmission of a request message for static calibration to the device performing the calibration method or system. The preset conditions may be triggered every half hour during continuous driving, or triggered according to the driving environment of the vehicle during driving.

According to the example of FIG. 5 of the present disclosure, quasi-static calibration is performed by manual triggering. As shown in FIG. 5, in step S600, if a request to perform a quasi-static calibration is received, the process proceeds to step S601, otherwise, the steps are maintained in a state to be executed, for example, as steps to be executed. In step S601, the quasi-static calibration unit 436 read multiple sets of pitch angle θ and the yaw angle β from the data stack 434, while the quasi-static calibration unit 436 also obtains vehicle state data from the data stack 434. For example, vehicle speed data of the vehicle, vehicle steering wheel, yaw rate information, and the like. Alternatively, these data may also be obtained by the quasi-static calibration unit 436 directly from the relevant components of the vehicle, such as the vehicle speed sensor 44, the yaw rate sensor 46 and the steering wheel angle sensor, etc., of the vehicle. The data stack 434 does not have to store the vehicle state data. In step S601, the quasi-static calibration unit 436 may also acquire history information related to the road stored in the vehicle as auxiliary information to assist in determining, for example, a smooth state of the road surface. It should be understood that the sets of pitch angle θ and the yaw angle β read from the data stack include stack timestamp information.

Step S602 is a judgment on the execution of step S601, and if step S601 does not output any of the sets of pitch angle θ and the yaw angle β within the predetermined condition and no vehicle state data is output, a timeout is determined, returning the information that the calibration has failed. Otherwise, the process proceeds to step S603. The preset condition can be the time, such as 30 seconds, or the distance traveled by the vehicle, such as 100 meters traveled by the vehicle, both of which are output.

In step S603, the quasi-static calibration unit 436 determines whether the number of the sets of pitch angle θ and the yaw angle β meet the quantity to be calibrated. If a positive judgment is determined, the process goes to step S604, otherwise, the process goes back to step S601.

In step S604, the quasi-static calibration unit 436 determines whether the current state of the vehicle is similar to the environment required for static calibration based on the acquired vehicle state data and auxiliary information (if any). The consistency between the pitch angle θ and the yaw angle β is determined by the variance of the pitch angle θ and the yaw angle β. When it is determined that the state of the vehicle is similar to the environment required for the static calibration and the consistency between the pitch angle θ and the yaw angle β is good, the process proceeds to step S605, otherwise the calibration fails.

In step S605, the sets of pitch and yaw angles are averaged and used as quasi-static calibration external parameters. Thus, by executing the steps S600 to S605, it is possible to give an external camera parameter close to the vehicle stationary condition when the road condition is good and the vehicle is running smoothly, based on the external parameters dynamically calibrated during running.

In the above example, the external parameters calibrated by the real-time calibration unit and/or the quasi-static external parameters calibrated by the quasi-static calibration unit can be transmitted to the camera 40 as the external parameters as required. Of course, the external parameters calibrated by the real-time calibration unit and/or the quasi-static external parameters calibrated by the quasi-static calibration unit may be transmitted to any component, module or system of the vehicle that requires data modification.

In addition, the real-time calibration unit 432 and the quasi-static calibration unit 436 in the example may be implemented in the same module or device, for example, in the same processor.

In the external parameter calibration system described in conjunction with FIG. 3 and FIG. 4, a first processing unit and a real-time calibration unit for performing real-time calibration, and a second processing unit and a quasi-static calibration unit for performing quasi-static calibration. It may be implemented by hardware such as a processor, or by a combination of a processor and software. For example, the processor is implemented in conjunction with software instructions. The data stack may then be implemented by a storage component such as a cache.

In comparison with conventional static calibration schemes based on special equipment such as a calibration board, when performing the external parameter calibration method or employing the external parameter calibration system in the present disclosure, not only can the external parameters of the camera be calibrated dynamically in the driving process, but also a quasi-static calibration method can be used to give an external parameter close to the stationary state of the vehicle when the road condition is good and the vehicle is running smoothly.

In addition, compared with calibration scheme based on track of a vehicle, pedestrian, etc., when implementing that external parameter calibration method or employing the external parameter calibration system described in the present disclosure, it is also possible to give calibration results frame by frame so as to respond more quickly to changes in the attitude of the vehicle.

Furthermore, compared with the conventional lane line-based dynamic calibration schemes, the implementation of the external parameter calibration method or the use of the external parameter calibration system described in the present disclosure is able to adapt to curve and ramp situations as much as possible, The application range of dynamic calibration is greatly expanded.

The basic principles of the present disclosure have been described above in connection with different embodiments. It should be noted that the above-mentioned advantages, advantages, effects and the like are examples and not limitations, and these advantages, advantages, effects and the like are not necessarily provided by the examples and embodiments disclosed herein. In addition, the specific details disclosed above are merely for example and ease of understanding, and the functions to be realized by the examples of the present application are not limited to other details.

The block diagrams of devices, apparatus, facilities, systems referred herein are illustrative examples only and are not intended to require or imply that they must be connected, arranged, configured in the manner shown in the block diagrams. The devices, apparatus, facilities, systems may be connected, arranged, configured in any manner as will be appreciated by those skilled in the art. Wordings such as "including" "comprising" "having" and the like are open-ended words that mean "including but not limited to" and are used interchangeably therewith. As used herein, the words "or" and "and" refer to the words "and/or" and may be used interchangeably therewith, unless the context expressly indicates otherwise. As used herein, the term "such as" refers to a phrase "such as, but not limited to," and may be used interchangeably therewith.

The methods and apparatus of the present disclosure may be implemented in many ways. For example, the methods and apparatus of the present disclosure may be implemented in software, hardware, firmware, or any combination of software, hardware, and firmware. The above order of steps for the method is for illustration only, and the steps of the method of the present disclosure are not limited to the order specifically described above, unless specifically stated otherwise.

It should also be noted that in the device, apparatus and methods disclosed herein, the components or steps may be disassembled and/or recombined. These decompositions and/or recombinations should be considered equivalent to the present application.

The description herein taken in conjunction with the drawings is intended to enable any person skilled in the art to understand, make or use the disclosure. Modifications to the details described will be readily apparent to those skilled in the art, and the general principles defined herein may be applied to other aspects without departing from the scope of the present disclosure. Accordingly, the present disclosure is not intended to be limited to the aspects illustrated herein, but is in the widest scope consistent with the principles and novel features disclosed herein.

Although a number of example aspects and embodiments have been discussed above, those skilled in the art would recognize certain variations, modifications, changes, additions and sub-combinations thereof.

What is claimed is:

1. An external parameter calibration method for an image acquisition apparatus having a camera, comprising:
step a, acquiring images from the image acquisition apparatus, wherein the images comprise reference objects captured by the image acquisition apparatus during a traveling of a vehicle;
step b, dividing the reference objects in the acquired images into a plurality of sections along a road direction the vehicle is travelling, and fitting the reference objects in each of the sections into straight lines;
step c, determining a pitch angle and a yaw angle of the image acquisition apparatus based on vanishing points of straight lines in each of the sections;
step d, filtering sequences of the determined pitch angle and yaw angle along the road direction;
step e, obtaining straight portions in the road from the filtered sequences of the pitch angle and the yaw angle;
step f, storing data of the pitch angle and yaw angle corresponding to the straight portions into a data stack; and
step h, determining a quasi-static calibration external parameter from the pitch angle and the yaw angle in the data stack when a vehicle state data of the vehicle indicates that the vehicle state satisfies a preset requirement;
wherein the vehicle state data is acquired from vehicle-related components for determining a vehicle running environment;
wherein the vehicle state data comprises one or any combination of a speed, a steering wheel angle, and a yaw rate of the vehicle; and
wherein after obtaining the straight portion of the road from the filtered sequence of the pitch angle and the yaw angle, the method further comprises performing steps b to e on the straight portion if an output of the straight portion is not satisfied.

2. The external parameter calibration method of claim 1, wherein the data stack further stores the vehicle state data.

3. The external parameter calibration method of claim 2, wherein the reference objects are reference objects substantially parallel to the road direction and located within a certain distance traveled by the vehicle.

4. The external parameter calibration method of claim 3, wherein the reference objects are lane lines.

5. The external parameter calibration method of claim 4, wherein after obtaining the straight portion of the road from the filtered sequence of the pitch angle and the yaw angle, the method further comprises performing steps b to e on the straight portion until an output of the straight portion is satisfied.

6. The external parameter calibration method of claim 4, wherein the vehicle state data of the vehicle indicates that the vehicle state satisfies a preset requirement that the vehicle is in a stable running state.

7. An external parameter calibration device for an image acquisition apparatus, comprising a processor and a memory; wherein the memory is configured to store instructions; and the processor is configured to implement the method of claim 1 when executing the stored instructions.

8. An external parameter calibration system for an image acquisition apparatus having a camera, comprising:
an acquisition unit configured to acquire images from images acquired by the image acquisition apparatus; wherein the images are images containing reference objects acquired by the image acquisition apparatus during a driving of a vehicle;
a first processor configured to:

divide the reference objects in the image into a plurality of sections along a road direction, and fit the reference objects in each of the sections into straight lines;

determine pitch angles and yaw angles of the image acquisition apparatus based on vanishing points of the straight lines in each of the sections;

filter sequences of the determined pitch angles and yaw angles along the road direction; and obtain straight portions in the road from the filtered sequences of the pitch angles and yaw angles, and store data of the pitch angles and yaw angles corresponding to the straight portions to a data stack;

a data stack configured to store the data of the pitch angles and yaw angles for the straight portions; and a second processor configured to determine quasi-static calibration external parameters from the pitch angles and yaw angles in the data stack when a vehicle state data of the vehicle indicates that the vehicle state satisfies a preset requirement;

wherein the vehicle state data is vehicle state data acquired from vehicle-related components for determining a vehicle running environment;

wherein the vehicle state data comprises one or any combination of a speed, a steering wheel angle, and a yaw rate of the vehicle; and wherein after obtaining the straight portion of the road from the filtered sequence of the pitch angle and the yaw angle, the method further comprises performing steps b to e on the straight portion if an output of the straight portion is not satisfied.

9. The external parameter calibration system for an image acquisition apparatus of claim 8, wherein the data stack further stores the vehicle state data.

10. The external parameter calibration system for an image acquisition apparatus of claim 9, wherein the reference objects are lane lines; and the vehicle state data comprises one or any combination of a speed of the vehicle, a steering wheel angle, and a yaw rate.

* * * * *